C. J. PETERSON.
MOTION PICTURE MACHINE.
APPLICATION FILED MAR. 21, 1917.
1,258,704.
Patented Mar. 12, 1918.
3 SHEETS—SHEET 2.
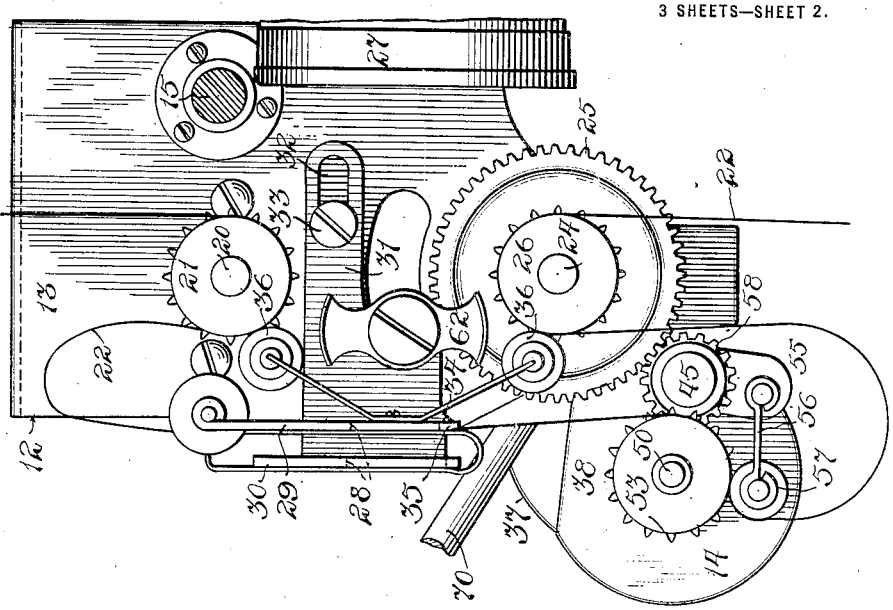
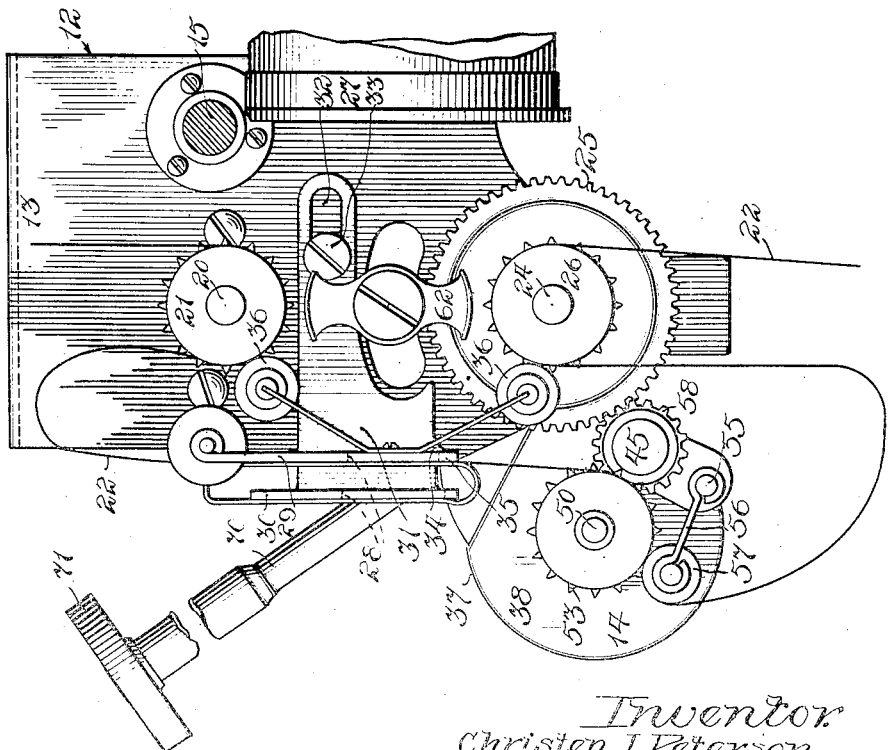
Inventor
Christen J. Peterson

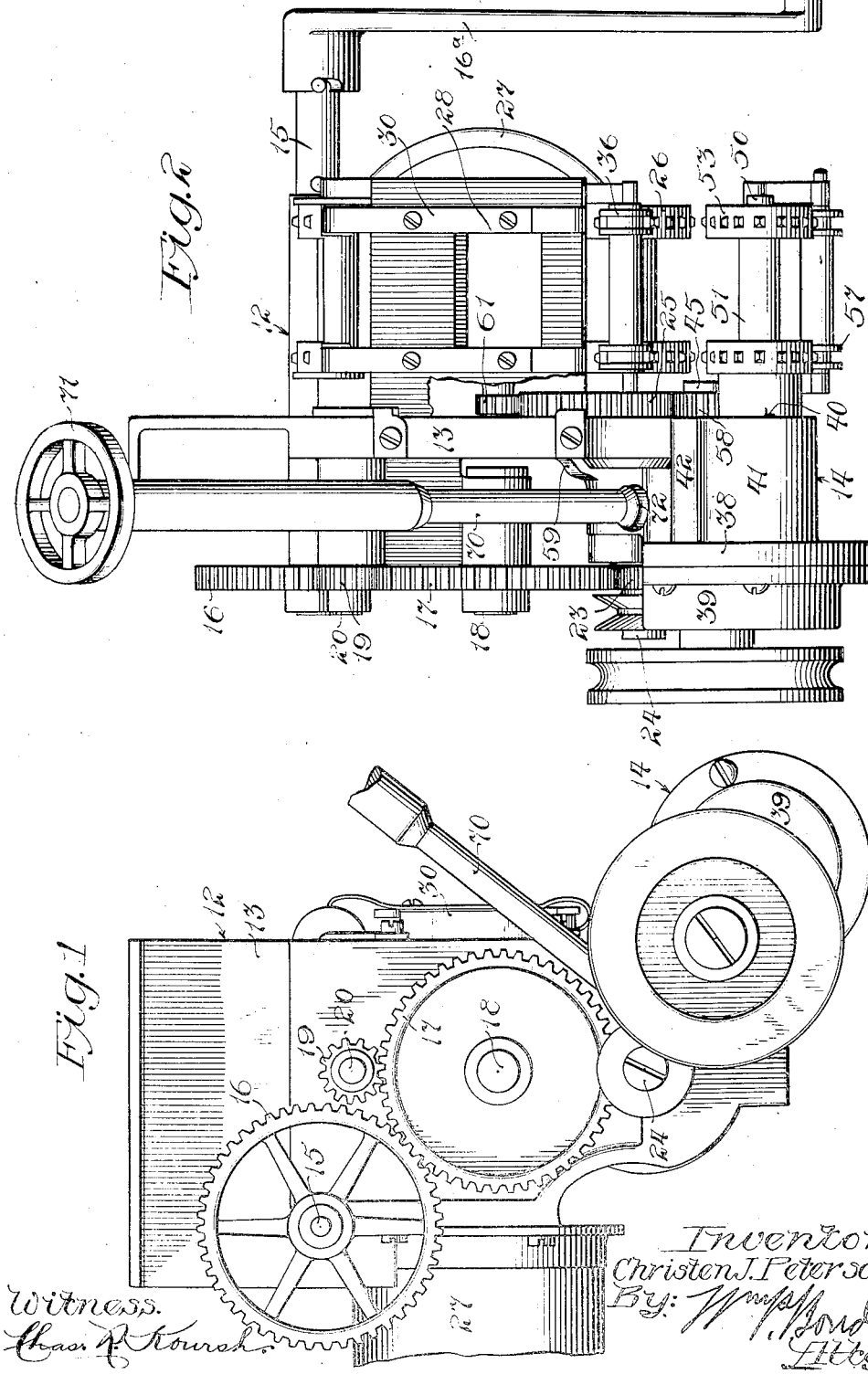

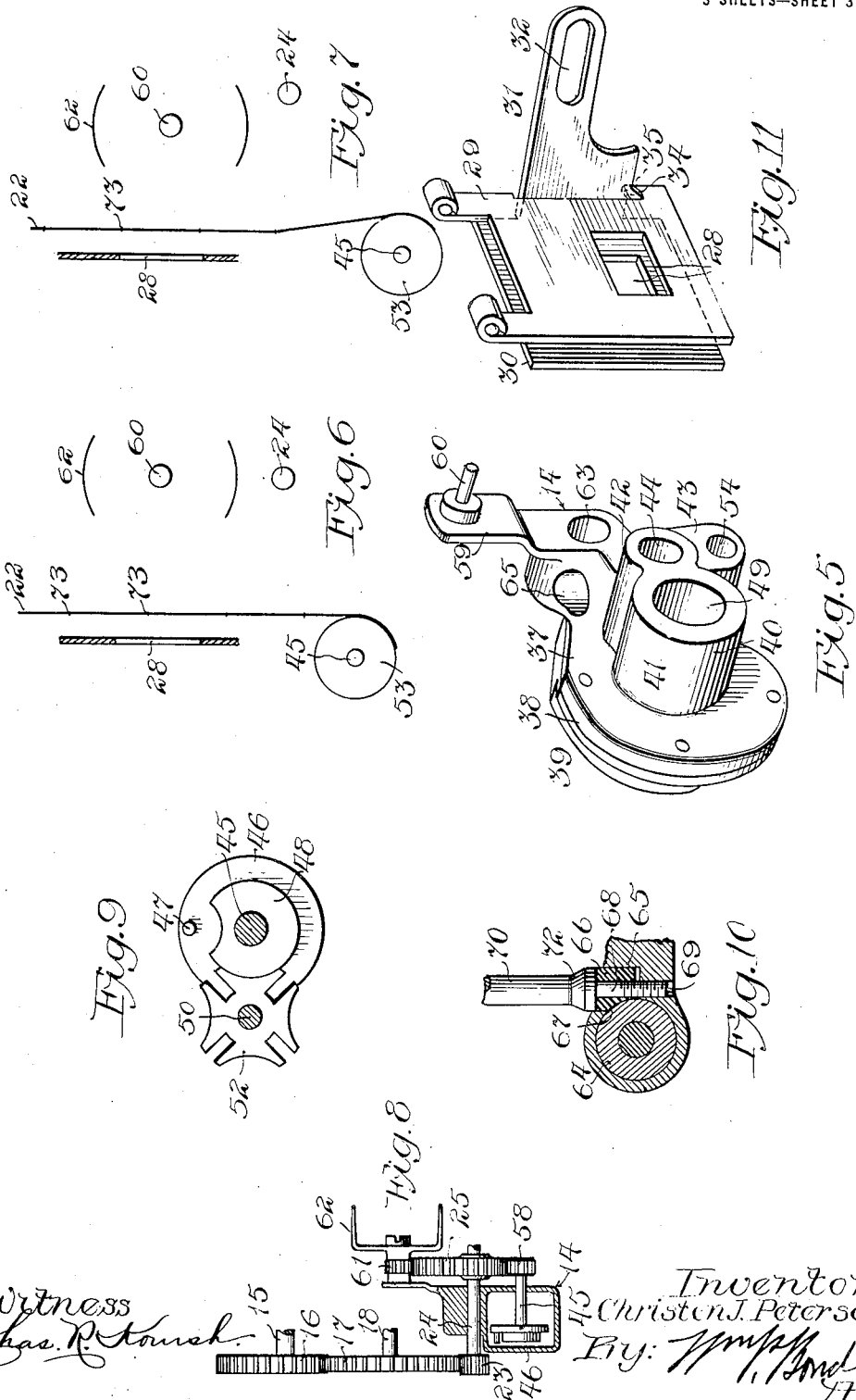

UNITED STATES PATENT OFFICE.

CHRISTEN J. PETERSON, OF CHICAGO, ILLINOIS.

MOTION-PICTURE MACHINE.

1,258,704.

Specification of Letters Patent.    Patented Mar. 12, 1918.

Application filed March 21, 1917.   Serial No. 156,420.

*To all whom it may concern:*

Be it known that I, CHRISTEN J. PETERSON, a citizen of the United States, residing at Chicago, in the county of Cook and State of Illinois, have invented certain new and useful Improvements in Motion-Picture Machines, of which the following is a specification.

The present invention relates to that part of a motion-picture machine known as the head, which contains the film-feeding apparatus and light apertures, together with the shutter.

One object of the invention is to make the head in two parts, one of which will be fixed and the other movable, and to mount in the movable portion the shutter mechanism, the intermittent film-feeding sprocket, and the star and cam-wheel for actuating the film-feeding sprocket.

A further object of the invention is to so arrange the shutter and the film-feeding sprocket that when the movable portion of the head is shifted, for the purpose of framing the picture, the film-feeding sprocket will be moved in a line approximately parallel with the film, and the shutter in a line approximately at right angles to the film.

A further object of the invention is to provide a driving connection between the film-feeding sprocket and shutter, and to maintain this connection at all times, thereby maintaining a synchronous movement between the film-feeding sprocket and shutter.

A further object of the invention is to provide a gear connection between the sprocket and shutter in the form of a planetary gear, and to swing the movable member about the axis of the central gear of the planetary gear, whereby the outer gears of the planetary gear will move in a path of travel concentric with the periphery of the central gear and thereby remain at all times in mesh with the central gear.

A further object of the invention is to provide a hand lever for actuating the movable portion of the head, and to provide means for locking the movable portion against movement, which locking means will be rendered operative or inoperative in accordance with the position of the hand lever.

The invention further consists in the features of construction and combination of parts hereinafter described and claimed.

In the drawings:

Figure 1 is a side elevation showing a head equipped with the devices of the present invention;

Fig. 2, a front view of said head;

Fig. 3, an elevation looking from the opposite side from that shown in Fig. 1, and showing the movable member in one position;

Fig. 4, a view similar to Fig. 3, showing the movable portion shifted into another position, for the purpose of framing the picture;

Fig. 5, a perspective detail of the movable portion;

Fig. 6, a diagrammatic view, showing the shutter and feed-sprocket in one position;

Fig. 7, a diagrammatic view, showing the parts illustrated in Fig. 6 in the position assumed when the framing operation is made;

Fig. 8, a diagrammatic view of the gear connection between the cam and shutter, and also showing the gear connection between these parts and the main drive shaft;

Fig. 9, a detail of the cam and star-wheel mechanism;

Fig. 10, a cross section, showing the means for locking the movable portion against movement; and Fig. 11, a perspective detail of the film gates.

In the art to which the present invention relates, it is frequently necessary during the projection of a picture to frame the film with respect to the light aperture. The dimensions of the light aperture are approximately the same as the dimensions of a picture, and if for some reason or other the feed of the film past the light aperture becomes inaccurate, the pictures will misaline with the aperture, with the result that a portion of one picture and a portion of the next adjacent picture are projected at the same time upon the screen. This, of course, is objectionable and must be rectified by a bodily shifting of the film strip, so as to again bring the pictures into proper alinement with the light aperture.

In the present invention, it is intended to carry out this framing operation by a bodily shifting of the film-feeding sprocket and the cam and star-wheel for operating the sprocket, together with a bodily shifting of the shutter, and to bodily shift the axes of all of the parts, but maintain each of said axes in the same relative position with respect to one another. When so shifted, the sprocket will be moved in a direction substantially longitudinally of the film, so that it exerts the necessary pulling or pushing action against the strip of film to move it bodily and frame it, and the shutter will be moved in a direction approximately at right angles to the film and light aperture, so as not to objectionably change its position with respect to either the said film or light aperture. In bodily shifting the above parts, a driving connection between the same and shutter is at all times maintained, so that these parts continue to be driven together in the desired manner.

The invention relates primarily to a simple construction, whereby a framing can be obtained as above outlined. At the same time, the construction of the machine as a whole is maintained simple and durable, and is one which does not require accurate mechanical fitting or adjustment of the parts to maintain them operative.

Referring now to the drawings, the device is shown in connection with a head 12 of a motion-picture machine, which head comprises a fixed portion 13 and a movable portion 14. Mounted upon the fixed portion is a main drive shaft 15 actuated by a handle 16, or otherwise. Attached to this shaft 15 is a gear 16, which meshes with a gear 17 on a stub shaft 18; and meshing with the gear 17, but out of mesh with the gear 16, is a pinion 19 on a shaft 20. To this shaft is secured a film-feeding sprocket 21, which pulls the film 22 from a supply reel (not shown). Meshing with the gear 17 is a pinion 23 on a shaft 24. This shaft carries a gear 25, which is the central gear of a system of planetary gears, which will hereinafter be described.

Also located upon the shaft 24 is a take-up sprocket 26 for delivering the film onto the take-up reel (not shown). Carried by the fixed portion of the head is a lens 27, of any suitable nature, which projects the light through apertures 28, one of which is formed in an inner gate member 29, and the other in an outer gate member 30. Attached to the outer gate member is a plate 31, which extends rearwardly and is provided with a slot 32, into which projects the pin or stud of a headed member 33.

The plate 31 is provided with a lip 34, which, when the gates are in closed position, projects over an extension 35 on the inner gate member, and when the projection and lip are in engagement, as in Fig. 11, the gates are held closed. When it is desired to open the gates for the purpose of threading the film, etc., a slight upward movement is given to the outer gate member 28, which lifts the lip free from the projection 35 and allows the outer gate to be pulled away from the inner gate with a straight or rectilinear movement; and the outer gate is guided in its in and out movements through the coöperation of the stud of the headed member 33 and the walls of the slot 32. Suitable film presser rolls 36 are provided for the feed-sprocket and the take-up sprocket.

The movable portion 14 of the head comprises a member 37 (see Fig. 5). This member is formed, as shown, at one end with a casing 38, closed by means of a suitable cap or cover 39, and extending from the fixed portion of the casing is a boss or lug 40, which embodies a sleeve portion 41, a sleeve portion 42, and a sleeve portion 43.

The sleeve 42 is formed with a bore 44, into which extends a shaft 45, which carries upon one end thereof and within the casing, a disk 46, having mounted thereon the usual pin 47 and star-wheel locking portion 48. This disk and its associated parts constitute what is ordinarily termed the cam-member of the intermittent or Geneva movement.

The sleeve 41 is formed with an opening 49, through which extends a shaft 50, surrounded by a sleeve 51. This shaft, at the portion lying within the casing, has affixed thereto a star-wheel 52 of the ordinary and usual construction; and the shaft extends to the outside of the casing and has mounted thereon the intermittent film-sprocket 53. This sprocket is given an intermittent movement through the coöperation of the cam and star-wheel, as is usual in such devices.

The sleeve 43 is provided with an opening 54, which receives a pin 55, to which is secured a link 56 carrying a presser roll 57 for holding the film onto the intermittent sprocket 53. That portion of the shaft 45 which lies to the outside of the casing 37 has a pinion 58 secured thereto, which is in mesh with the periphery of the central gear 25.

The movable portion is further provided with an upwardly extending lug or part 59, which carries a stem 60, upon which is revolubly mounted a pinion 61, also meshing with the periphery of the central gear 25; and this shaft 60 carries also a shutter member 62, which is revolubly mounted thereon, but is fixedly connected to the pinion 61. The pinion 61, pinion 58, and gear 25, constitute a planetary gear and form the driving connection between the cam-member and the shutter.

The movable member is formed with an opening 63, within which, when the parts are assembled, is placed a sleeve 64. This sleeve is mounted on the shaft 24. The sleeve is mounted so that it is held against rotative movement with respect to the shaft, and when a certain locking device, hereinafter to be described, is out of locking position, the movable portion can turn freely on the sleeve, so that the center of movement of the movable portion is, in fact, the center of the shaft 24. The importance of this will appear hereinafter.

A cross bore or passage 65 is formed in the movable member at a point adjacent to the opening 63, and into the cross bore 65 is inserted a plug 66, having a beveled surface 67 adapted to engage with the periphery of the sleeve 64. A stem 68 extends through the plug 66 and into a tapped recess 69 in the body of the movable portion 14. This stem 68 is attached to a rod 70, which forms the lever member for actuating the movable portion, and this lever member terminates in a hand grip 71.

It will be remembered that the sleeve 64 is fixed with respect to the shaft 24 and with respect to the movable portion of the head. When the rod 70 is turned so as to cause the head 72, adjacent the lower end thereof, to press upon the block or plug 66, the beveled face 67 of the latter will be forced into a hard engagement with the sleeve 64, but, owing to the connection between the movable section 14 and the plug, the movable section will be held against any rotative movement about the sleeve 64, and will thus be locked in position against movement. Such locking is necessary at all times except when it is desired to frame the picture, since if the movable portion were loose during the projection of the picture, there would be a shaking of the parts, causing a bad projection.

A slight turning of the rod 70 will cause the stem 68 to advance upward in the tapped recess 69, moving upward the rod 70 and head 72 thereon, to release said head from pressure against the block 66; and this block will thus be out of hard engagement with the sleeve 64, whereby the movable section can then be swung about this sleeve and about the axis of the shaft 24. The construction and arrangement of this movable portion has to do entirely with carrying out the framing operation; and the movement of the parts during this operation will be probably best understood by reference to Figs. 3, 4, 6 and 7.

Referring more particularly to Figs. 6 and 7, there has been shown, by means of the cross lines numbered 73, the division points between the pictures on the strip of film. By referring to Fig. 6, it will be seen that through an inaccurate feeding, the division point between the pictures has reached the center of the light aperture, and thus a portion of one picture and a portion of another are being simultaneously projected upon the screen.

In order to frame the picture and again restore it in proper alinement with the light aperture, the lever 70 is actuated by the operator and the movable section 14 swung about its pivotal center, which is the center of the shaft 24. The intermittent sprocket 53 will be moved from the position shown in Fig. 6 to the position shown in Fig. 7, and will have traveled downward a distance, and in a line approximately parallel with the length of the film. Such movement will put a positive pull upon the film, so as to bring the division marks into proper position with respect to the light aperture, as shown in Fig. 7.

This film-feeding sprocket is carried by the movable portion, and when it moves, simultaneously therewith will move the star-wheel and the cam, so that these three parts are always maintained in the same relative position and the axial centers of the parts are maintained in the same constant relative position, although there is a bodily movement of all of said parts and their respective axes. It will be observed that this movement of the sprocket is one which is best adapted to either push or pull the film to properly frame it, as to whether the film is pulled or pushed depending upon whether the hand lever is moved in a direction to carry the intermittent sprocket up or down.

Simultaneously with the movement just described is a movement of the upwardly extending portion 59 of the movable member 14. This will be better understood from Figs. 6 and 7, where it will be seen that such movement carries the shutter and shutter shaft from the position of Fig. 6 to the position of Fig. 7, and that this movement of the shutter and shutter shaft is approximately at right angles to the film, so that while the shutter will be moved nearer to or farther away from the light aperture during the framing operation, it has no appreciable movement lengthwise of the film, so that it would be brought into improper alinement with the light aperture. Thus, by the arrangement described, the film-feeding sprocket is moved in proper direction to move the film, and the shutter moved in proper direction so as not to objectionably disturb its position with respect to the light aperture; and while the intermittent sprocket, star-wheel, cam and shutter, together with their respective shafts, are all bodily moved, such movement is simultaneous and maintains all of the said parts and their respective shafts in the same relative position with respect to one another.

It is to be recalled that the cam shaft of the intermittent mechanism was driven by the pinion 58 and the shutter shaft by the pinion 61, and that motion to both pinions was imparted by the gear 25. The entire movable portion 14 swings about the shaft 24 as a pivotal center. This shaft is the axis of the gear 25 and consequently the pinions 61 and 58 are moved in a path of travel concentric to the gear 25, and therefore at all times remain in mesh with said gear, so that the driving connection between the cam-shaft and the shutter is at all times maintained.

It will be seen from the above that by a very simple construction, a simultaneous radial movement of the intermittent sprocket and shutter about a common center has been provided for, whereby the picture can be quickly and efficiently framed and the parts maintained in their proper position and condition for continuing their functions in carrying out the projecting operation.

I claim:

1. In a motion-picture machine, the combination of a head comprising a fixed portion and a movable portion, film advancing means and a shutter carried by the movable portion, a train of gears between the film advancing means and shutter embodying a main driving gear carried by the fixed portion, a mounting for said movable portion permitting it to swing about the center of the main driving gear as a pivot when a framing of the picture is desired, said movement carrying said film advancing means bodily in a direction lengthwise of the film and the shutter bodily in a direction crosswise of the film, and said train of gears being arranged to remain constantly in mesh, substantially as described.

2. In a motion-picture machine, the combination of film advancing means, a shutter, a common carrier for the film advancing means and shutter, means for moving said carrier to simultaneously shift the film advancing means and shutter bodily to effect a framing operation, said film advancing means moving in a direction lengthwise of the film and said shutter in a direction transversely of the film, and a driving connection between the film advancing means and shutter arranged to remain in operative engagement at all times, substantially as described.

3. In a motion-picture machine, the combination of a head comprising a fixed portion and a movable portion, film advancing means and a shutter carried by the movable portion, a train of gears between the film advancing means and shutter embodying a main driving gear carried by the fixed portion, a mounting for said movable portion permitting it to swing about the center of the main driving gear as a pivot when a framing of the picture is desired, said movement carrying said film advancing means bodily in a direction lengthwise of the film and the shutter bodily in a direction crosswise of the film, said train of gears being arranged to remain constantly in mesh, and means for locking the movable portion against movement, substantially as described.

4. In a motion-picture machine, the combination of film advancing means, a shutter, means for simultaneously shifting the film advancing means and shutter bodily to effect a framing operation, said film advancing means moving in a direction lengthwise of the film and said shutter in a direction transversely of the film, a driving connection between the film advancing means and shutter arranged to remain in operative engagement at all times, and means for locking the said movable parts against such movement, substantially as described.

5. In a motion-picture machine, the combination of film advancing means, a shutter, means for simultaneously shifting the film advancing means and shutter bodily to effect a framing operation, said film advancing means moving in a direction lengthwise of the film and said shutter in a direction transversely of the film, a driving connection between the film advancing means and shutter arranged to remain in operative engagement at all times, a hand lever for moving said parts, and means associated with the hand lever for locking the parts against movement when the lever is placed in a certain position, substantially as described.

6. In a motion-picture machine, the combination of film advancing means, a shutter, a planetary gear connection between the film advancing means and shutter, means for bodily and simultaneously moving the film advancing means, shutter, and outer gears of the planetary gear about the axis of the central gear of the planetary gear, whereby a framing of the picture is obtained, and said film advancing means moving in a direction longitudinally of the film and the shutter transversely of the film, substantially as described.

7. In a motion-picture machine, the combination of film advancing means, a shutter, a planetary gear connection between the film advancing means and shutter, means for bodily and simultaneously moving the film advancing means, shutter, and outer gears of the planetary gear about the axis of the central gear of the planetary gear whereby a framing is obtained, said film advancing means moving in a direction longitudinally of the film and the shutter in a direction transversely of the film, and means for locking the said parts against movement, substantially as described.

8. In a motion-picture machine, the combination of a head comprising a fixed portion and a movable portion, said movable portion comprising an angle-member, a shutter carried by one arm of said member, film advancing means carried by the other arm of the member, said angle-member when moved to frame the picture carrying bodily the film-advancing means in a direction longitudinally of the film and the shutter bodily in a direction transversely of the film, and a driving connection between the film advancing means and shutter arranged to be maintained constantly in operative engagement, substantially as described.

9. In a motion-picture machine, the combination of a head comprising a fixed portion and a movable portion, film advancing means and a shutter mounted on the movable portion, a planetary gear connection between the film advancing means and shutter embodying a central gear on the fixed portion and outer gears on the movable portion, said movable portion having a mounting enabling it to move about the axis of said central gear as a center, whereby the gears of said gear connection are constantly maintained in mesh, said movement of said movable portion carrying the film advancing means and shutter bodily, whereby the film is moved to frame the picture, a hand lever for actuating said movable portion carried by said portion, and a friction device carried by said movable portion and operable by the hand lever for locking the movable portion against movement, substantially as described.

10. In a motion-picture machine, the combination of a head comprising a fixed portion and a movable portion, a casing forming a part of said movable portion, a cam and star-wheel within the casing, a film-feeding sprocket on said movable portion actuated with an intermittent movement by said cam and star-wheel, a shutter mounted on said movable portion, means for actuating said shutter with a continuous movement, a pivotal mounting for said movable portion, said portion when moved to frame the picture carrying the said sprocket and its associated parts bodily in a direction lengthwise of the film, and the shutter bodily in a direction transversely of the film, and a constantly maintained driving means for said shutter and sprocket-actuating means embodying a main driving gear and said movable portion moving about the center of said main driving gear in the framing operation, substantially as described.

11. In a motion picture machine, the combination of film advancing means, a shutter, a planetary gear drive between said film advancing means and shutter, a bell-crank mounted to turn about the center of the central gear of the planetary gear, said film advancing means and one of the outer gears of the planetary gear being carried by the horizontal arm of the bell-crank, said shutter and another of the outer gears of the planetary gear being carried by the vertical arm of the bell-crank, substantially as described.

12. In a motion picture machine, the combination of film advancing means, a shutter, a planetary gear drive between said film advancing means and shutter, a bell-crank mounted to turn about the center of the central gear of the planetary gear, said film advancing means and one of the outer gears of the planetary gear being carried by the horizontal arm of the bell-crank, said shutter and another of the outer gears of the planetary gear being carried by the vertical arm of the bell-crank, and means for locking said bell-crank against turning movement, substantially as described.

13. In a motion picture machine, the combination of a head comprising a fixed portion, film advancing means, a shutter, a gear connection for driving said film advancing means and shutter, a bell-crank mounted to swing about the center of said gear connection, a casing on the horizontal arm of the bell-crank, said casing inclosing said film advancing means, a pinion for driving the parts carried by the casing and extending to the outside thereof and meshing with the central gear of said gear connection, said shutter being carried by the vertical portion of the bell-crank, and a pinion for driving the shutter carried by said vertical portion and meshing with the central gear of said gear connection, substantially as described.

CHRISTEN J. PETERSON.